(12) United States Patent
Ebrahimi Afrouzi et al.

(10) Patent No.: US 11,935,256 B1
(45) Date of Patent: Mar. 19, 2024

(54) REMOTE DISTANCE ESTIMATION SYSTEM AND METHOD

(71) Applicants: Ali Ebrahimi Afrouzi, San Diego, CA (US); Soroush Mehrnia, Helsingborg (SE)

(72) Inventors: Ali Ebrahimi Afrouzi, San Diego, CA (US); Soroush Mehrnia, Helsingborg (SE)

(73) Assignee: AI Incorporated, Toronto (CA)

(*) Notice: Subject to any disclaimer, the term of this patent is extended or adjusted under 35 U.S.C. 154(b) by 132 days.

(21) Appl. No.: 17/316,006

(22) Filed: May 10, 2021

Related U.S. Application Data

(63) Continuation of application No. 15/954,335, filed on Apr. 16, 2018, now abandoned, which is a continuation of application No. 15/243,783, filed on Aug. 22, 2016, now Pat. No. 9,972,098.

(60) Provisional application No. 62/208,791, filed on Aug. 23, 2015.

(51) Int. Cl.
*G06T 7/521* (2017.01)
*G01S 17/48* (2006.01)
*G01S 17/89* (2020.01)
*G06T 7/55* (2017.01)

(52) U.S. Cl.
CPC ............. *G06T 7/521* (2017.01); *G01S 17/48* (2013.01); *G01S 17/89* (2013.01); *G06T 7/55* (2017.01); *G06T 2207/20221* (2013.01)

(58) Field of Classification Search
CPC .. H04N 13/271; H04N 13/239; H04N 13/204; H04N 2013/0081; G06T 7/521; G06T 7/593
See application file for complete search history.

(56) References Cited

U.S. PATENT DOCUMENTS

| | | |
|---|---|---|
| 5,054,912 A | 10/1991 | Kuchel |
| 6,396,946 B1 * | 5/2002 | Sogawa ............... H04N 13/189 348/E13.016 |
| 6,545,749 B1 | 4/2003 | Andersson |
| 6,847,435 B2 | 1/2005 | Honda |
| 7,187,452 B2 | 3/2007 | Jupp |
| 7,796,782 B1 | 9/2010 | Motamedi |
| 7,889,324 B2 | 2/2011 | Yamamoto |
| 7,995,799 B2 | 8/2011 | Schultz |
| 8,558,993 B2 | 10/2013 | Newbury |
| 9,677,986 B1 | 6/2017 | Baldwin |
| 9,800,795 B2 | 10/2017 | Zabatani |

(Continued)

*Primary Examiner* — Vincent Rudolph
*Assistant Examiner* — Raphael Schwartz

(57) ABSTRACT

A distance estimation system comprised of a laser light emitter, two image sensors, and an image processor are positioned on a baseplate such that the fields of view of the image sensors overlap and contain the projections of an emitted collimated laser beam within a predetermined range of distances. The image sensors simultaneously capture images of the laser beam projections. The images are superimposed and displacement of the laser beam projection from a first image taken by a first image sensor to a second image taken by a second image sensor is extracted by the image processor. The displacement is compared to a preconfigured table relating displacement distances with distances from the baseplate to projection surfaces to find an estimated distance of the baseplate from the projection surface at the time that the images were captured.

10 Claims, 4 Drawing Sheets

(56) References Cited

U.S. PATENT DOCUMENTS

| | | | |
|---|---|---|---|
| 2005/0280802 A1 | 12/2005 | Liu | |
| 2011/0071675 A1* | 3/2011 | Wells | H04N 5/332 |
| | | | 700/250 |
| 2012/0185091 A1 | 7/2012 | Field | |
| 2013/0107010 A1 | 5/2013 | Hoiem | |
| 2014/0156076 A1 | 6/2014 | Jeong | |
| 2014/0192158 A1 | 7/2014 | Whyte | |
| 2014/0225988 A1 | 8/2014 | Poropat | |
| 2014/0268098 A1 | 9/2014 | Schwarz | |
| 2014/0379247 A1 | 12/2014 | Ferguson | |
| 2015/0036886 A1 | 2/2015 | Matono | |
| 2015/0146926 A1 | 5/2015 | Ramachandran | |
| 2015/0198440 A1 | 7/2015 | Pearlman | |
| 2015/0269737 A1* | 9/2015 | Lam | H04N 13/111 |
| | | | 382/154 |
| 2015/0304631 A1 | 10/2015 | Lee | |
| 2015/0338204 A1 | 11/2015 | Richert | |
| 2017/0135617 A1* | 5/2017 | Alasirniö | A61B 5/14552 |
| 2020/0225673 A1 | 7/2020 | Ebrahimi Afrouzi | |

\* cited by examiner

REMOTE DISTANCE ESTIMATION SYSTEM AND METHOD

CROSS-REFERENCE TO RELATED APPLICATIONS

This application is a Continuation of U.S. Non-Provisional patent application Ser. No. 15/954,335, filed Apr. 16, 2018, which is a Continuation of U.S. Non-Provisional patent application Ser. No. 15/243,783, filed Aug. 22, 2016, which claims the benefit of U.S. Provisional Patent Application No. 62/208,791, filed Aug. 23, 2015, each of which is herein incorporated by reference in their entireties for all purposes.

FIELD OF THE DISCLOSURE

This disclosure relates to remote distance estimation systems and methods.

BACKGROUND OF THE DISCLOSURE

Mobile robotic devices are being used more and more frequently in a variety of industries for executing different tasks with minimal or no human interaction. Such devices rely on various sensors to navigate through their environment and avoid driving into obstacles.

Infrared sensors, sonar and laser range finders are some of the sensors used in mobile robotic devices. Infrared sensors typically have a low resolution and are very sensitive to sunlight. Infrared sensors that use a binary output can determine whether an object is within a certain range but are unable to accurately determine the distance to the object. Sonar systems rely on ultrasonic waves instead of light. Under optimal conditions, some sonar systems can be very accurate; however, sonar systems typically have limited coverage areas: if used in an array, they can produce cross-talk and false readings; if installed too close to the ground, signals can bounce off the ground, degrading accuracy. Additionally, sound-absorbing materials in the area may produce erroneous readings.

Laser Distance Sensors (LDS) are a very accurate method for measuring distance that can be used with robotic devices. However, due to their complexity and cost, these sensors are typically not a suitable option for robotic devices intended for day-to-day home use. These systems generally use two types of measurement methods: Time-of-Flight (ToF) and Triangulation. In ToF methods, the distance of an object is usually calculated based on the round trip of the emission and reception of a signal. In Triangulation methods, usually there is a source and a sensor on the device with a fixed baseline. The emitting source emits the laser beam at a certain angle. When the sensor receives the beam, the sensor calculates the degree at which the beam entered the sensor. Using those variables, the distance traveled by the laser beam may be calculated with triangulation.

A need exists for a more accurate and reliable, yet affordable, method for automatic remote distance measuring.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Embodiments of the present invention introduce new methods and systems for distance estimation. Some embodiments present a distance estimation system including a laser light emitter disposed on a baseplate emitting a collimated laser beam which projects a light point onto surfaces opposite the emitter; two image sensors disposed symmetrically on the baseplate on either side of the laser light emitter at a slight inward angle towards the laser light emitter so that their fields of view overlap while capturing the projections made by the laser light emitter; an image processor to determine an estimated distance from the baseplate to the surface on which the laser light beam is projected using the images captured simultaneously and iteratively by the two image sensors. Each image taken by the two image sensors shows the field of view including the point illuminated by the collimated laser beam. At each discrete time interval, the image pairs are overlaid and the distance between the light points is analyzed by the image processor. This distance is then compared to a preconfigured table that relates distances between light points with distances from the baseplate to the projection surface to find the actual distance to the projection surface.

In embodiments, the assembly may be mounted on a rotatable base so that distances to surfaces may be analyzed in any direction. In some embodiments, the image sensors capture the images of the projected laser light emissions and processes the image. Using computer vision technology, the distances between light points is extracted and the distances may be analyzed.

In embodiments, a method for remotely estimating distance comprises projecting a light from a light emitter onto a surface, capturing images of the projected light by each of at least two image sensors such that each image includes the projected light, overlaying the images captured by the at least two image sensors by a processor to produce a superimposed image, measuring a first distance in the superimposed image between the projected light from each of the captured images, and determining a second distance from a preconfigured table relating distances between the projected light with distances to the surfaces on which the light is projected to estimate distance to the surface on which the light is currently being projected.

In embodiments, a method for remotely estimating distance comprising projecting a light from a light emitter onto a surface, capturing images of the projected light by each of at least two image sensors such that each image includes the projected light, measuring a first distance between the projected light in each of the captured images, and determining a second distance from a preconfigured table relating distances between the projected light with distances to the surfaces on which the light is projected to estimate distance to the surface on which the light is currently being projected.

DETAILED DESCRIPTION OF SOME EMBODIMENTS

Figure 1A:
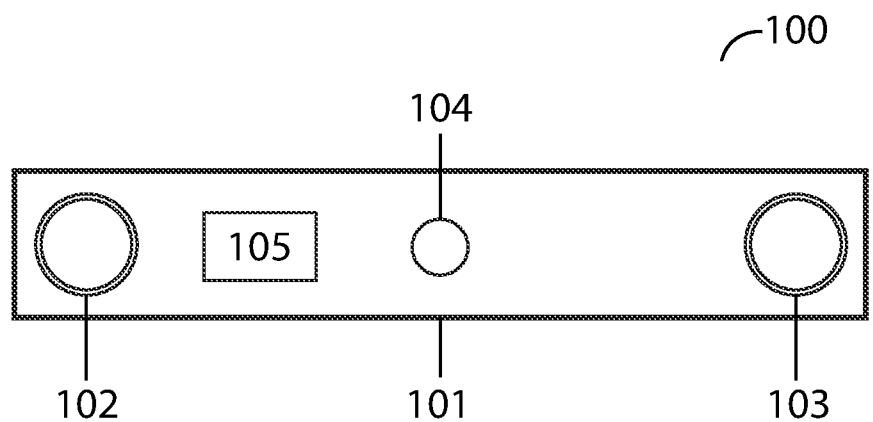
FIG. 1A illustrates a front elevation view of the distance estimation device, embodying features of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a computer and/or a dedicated computing device when appropriately programmed and may include a combination of a computer/computing device and dedicated/programmable circuits adapted for the various tasks pertaining to embodiments of the invention. The disclosure described herein is directed generally to one or more processor-automated methods and/or systems that estimate distance of a device with an object also known as distance estimation systems.

Embodiments described herein include a distance estimation system including a laser light emitter disposed on a baseplate emitting a collimated laser beam creating an illuminated, such as a light point or projected light point, on surfaces that are substantially opposite the emitter; two image sensors disposed on the baseplate, positioned at a slight inward angle towards to the laser light emitter such that the fields of view of the two image sensors overlap and capture the projected light point within a predetermined range of distances, the image sensors simultaneously and iteratively capturing images; an image processor overlaying the images taken by the two image sensors to produce a superimposed image showing the light points from both images in a single image; extracting a distance between the light points in the superimposed image; and, comparing the distance to figures in a preconfigured table that relates distances between light points with distances between the baseplate and surfaces upon which the light point is projected (which may be referred to as 'projection surfaces' herein) to find an estimated distance between the baseplate and the projection surface at the time the images of the projected light point were captured.

In some embodiments, the preconfigured table may be constructed from actual measurements of distances between the light points in superimposed images at increments in a predetermined range of distances between the baseplate and the projection surface.

In embodiments, each image taken by the two image sensors shows the field of view including the light point created by the collimated laser beam. At each discrete time interval, the image pairs are overlaid creating a superimposed image showing the light point as it is viewed by each image sensor. Because the image sensors are at different locations, the light point will appear at a different spot within the image frame in the two images. Thus, when the images are overlaid, the resulting superimposed image will show two light points until such a time as the light points coincide. The distance between the light points is extracted by the image processor using computer vision technology, or any other type of technology known in the art. This distance is then compared to figures in a preconfigured table that relates distances between light points with distances between the baseplate and projection surfaces to find an estimated distance between the baseplate and the projection surface at the time that the images were captured. As the distance to the surface decreases the distance measured between the light point captured in each image when the images are superimposed decreases as well.

Figure 1B:
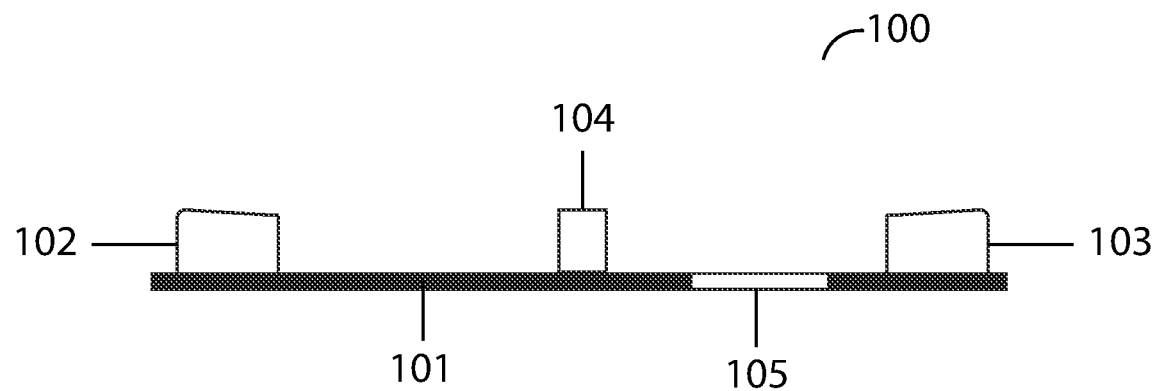
FIG. 1B illustrates an overhead view of the distance estimation device, embodying features of the present invention.

FIG. 1A illustrates a front elevation view of an embodiment of distance estimation system 100. Distance estimation system 100 is comprised of baseplate 101, left image sensor 102, right image sensor 103, laser light emitter 104, and image processor 105. The image sensors are positioned with a slight inward angle with respect to the laser light emitter. This angle causes the fields of view of the image sensors to overlap. The positioning of the image sensors is also such that the fields of view of both image sensors will capture laser projections of the laser light emitter within a predetermined range of distances. FIG. 1B illustrates an overhead view of remote estimation device 100. Remote estimation device 100 is comprised of baseplate 101, image sensors 102 and 103, laser light emitter 104, and image processor 105.

Figure 2:
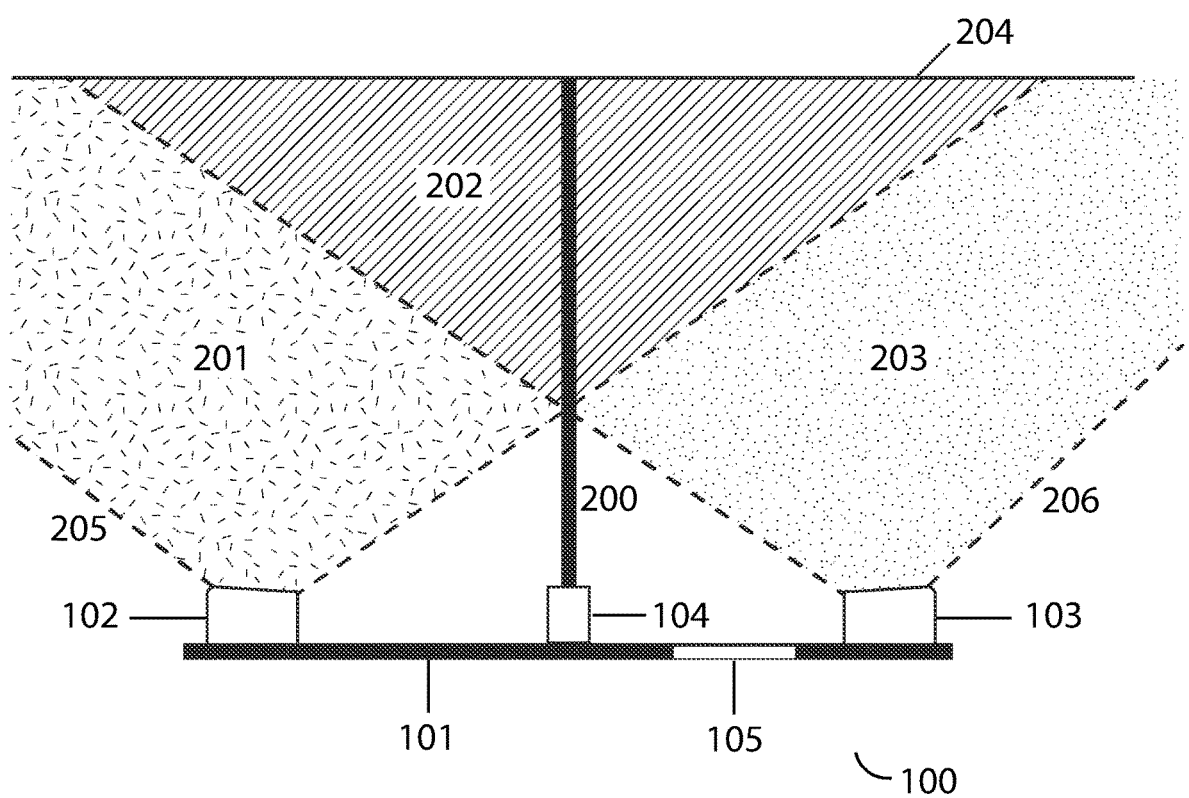
FIG. 2 illustrates an overhead view of the distance estimation device and fields of view of the image sensors, embodying features of the present invention.

FIG. 2 illustrates an overhead view of an embodiment of the remote estimation device and fields of view of the image sensors. Laser light emitter 104 is disposed on baseplate 101 and emits collimated laser light beam 200. Image processor 105 is located within baseplate 101. Area 201 and 202 together represent the field of view of image sensor 102. Dashed line 205 represents the outer limit of the field of view of image sensor 102 (it should be noted that this outer limit would continue on linearly, but has been cropped to fit on the drawing page). Area 203 and 202 together represent the field of view of image sensor 103. Dashed line 206 represents the outer limit of the field of view of image sensor 103 (it should be noted that this outer limit would continue on linearly, but has been cropped to fit on the drawing page). Area 202 is the area where the fields of view of both image sensors overlap. Line 204 represents the projection surface. That is, the surface onto which the laser light beam is projected.

Figure 3A:
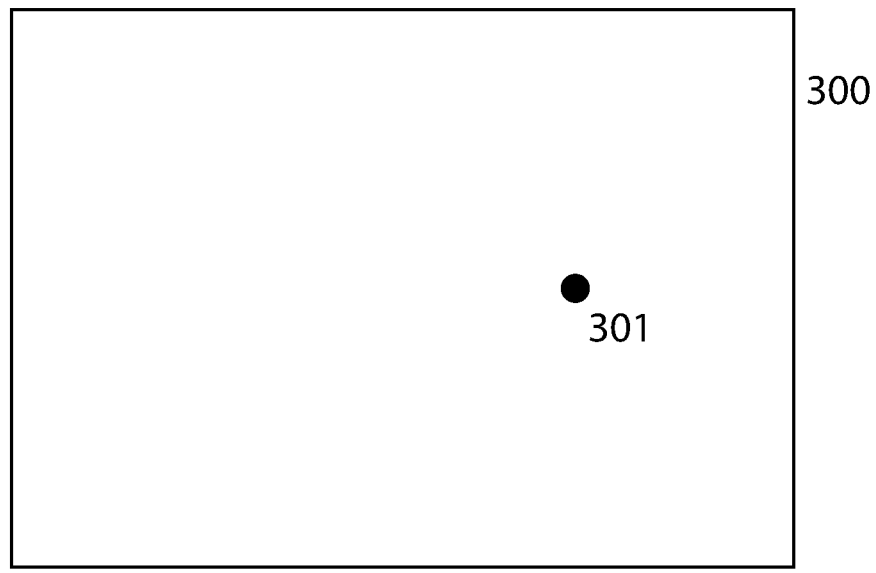
FIG. 3A illustrates an image captured by a left image sensor embodying features of the present invention.
Figure 3B:
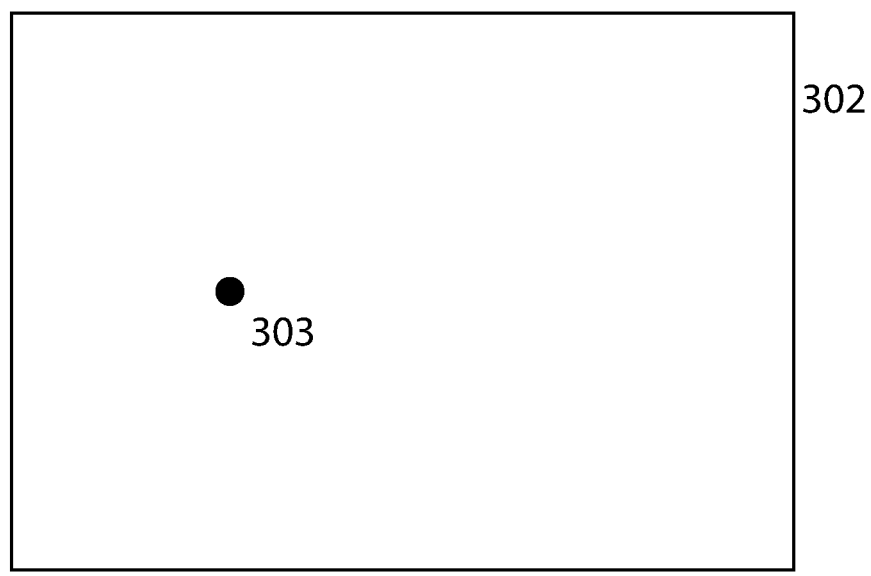
FIG. 3B illustrates an image captured by a right image sensor embodying features of the present invention.

The image sensors simultaneously and iteratively capture images at discrete time intervals. FIG. 3A illustrates an embodiment of the image captured by left image sensor 102 (in FIG. 2). Rectangle 300 represents the field of view of image sensor 102. Point 301 represents the light point projected by laser beam emitter 104 as viewed by image sensor 102. FIG. 3B illustrates an embodiment of the image captured by right image sensor 103 (in FIG. 2). Rectangle 302 represents the field of view of image sensor 103. Point 303 represents the light point projected by laser beam emitter 104 as viewed by image sensor 103. As the distance of the baseplate to projection surfaces increases, light points 301 and 303 in each field of view will appear further and further toward the outer limits of each field of view, shown respectively in FIG. 2 as dashed lines 205 and 206. Thus, when two images captured at the same time are overlaid, the distance between the two points will increase as distance to the projection surface increases.

Figure 4:
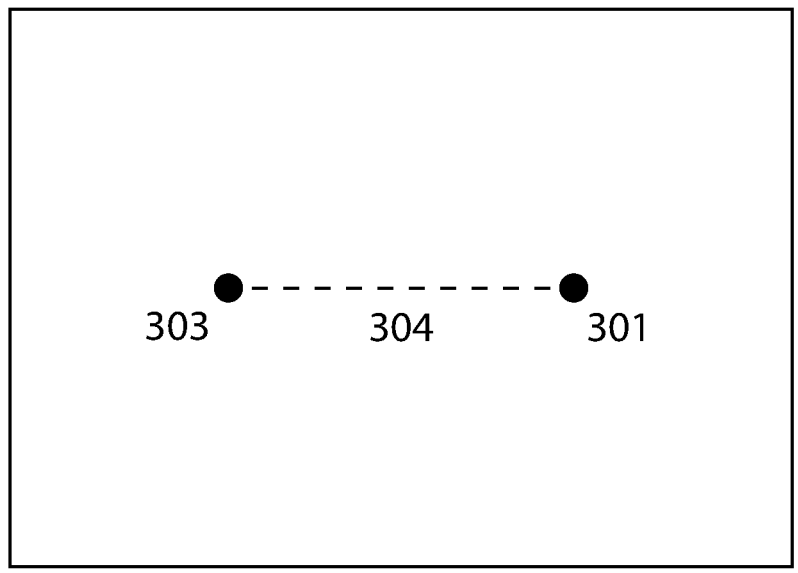
FIG. 4 illustrates an image captured by a right image sensor and an image captured by a left image sensor overlaid embodying features of the present invention.

FIG. 4 illustrates the two images from FIG. 3A and FIG. 3B overlaid. Point 301 is located a distance 304 from point 303. The image processor 105 (in FIG. 1A) extracts this distance. The distance 304 is then compared to figures in a preconfigured table that co-relates distances between light points in the superimposed image with distances between the baseplate and projection surfaces to find an estimate of the actual distance from the baseplate to the projection surface upon which the images of the laser light projection were captured.

In some embodiments, the distance estimation device further includes a band-pass filter to limit the allowable light.

In some embodiments, the baseplate and components thereof are mounted on a rotatable base so that distances may be estimated in 360 degrees of a plane.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching.

The invention claimed is:

1. A method for remotely estimating distance, comprising:
projecting, with a laser light emitter of a distance estimation device, a light onto surfaces opposite the laser light emitter, thereby illuminating the surfaces;
iteratively capturing, with each of at least two image sensors of the distance estimation device, images of the illuminated surfaces simultaneously at discrete time intervals, each captured image including the projected light;
superimposing, with the processor, the images captured by the at least two image sensors at a same time step to produce a superimposed image;
determining, with the processor, a first distance in the superimposed image between the projected light from each of the captured images forming the superimposed image; and
determining, with the processor, a second distance from the at least two image sensors to a surface on which the light is projected;
wherein:
the distance estimation device is disposed on a robotic device for use in avoiding obstacles during navigation;
the distance estimation device is positioned behind a band-pass filter disposed on the robotic device to limit an amount of light;
the surfaces on which the light is projected are within a predetermined range of distance from the laser light emitter;
images captured by each of the at least two image sensors at a same time step at least partially overlap;
the at least two image sensors are symmetrically disposed on either side of the laser light emitter;
each of the at least two image sensors are positioned at an angle such that a field of view of each image sensor at least partially overlaps and each image captured by the at least two image sensors includes the projected light; and
as the second distance decreases, the first distance decreases.

2. The method of claim 1, wherein:
the second distance is determined based on a preconfigured table relating the first distance with the second distance.

3. The method of claim 1, wherein the processor uses computer vision technology to extract the first distance.

4. The method of claim 1, wherein the first distance is determined by measuring in each of the images a distance between the projected light to a common point in each of the images and finding a difference between each of the two distances to the common point.

5. The method of claim 1, wherein the laser light emitter emits a light point or a light line.

6. A tangible, non-transitory, machine readable medium storing instructions that when executed by a processor effectuates operations comprising:
projecting, with a laser light emitter of a distance estimation device, a light onto surfaces opposite the laser light emitter, thereby illuminating the surfaces;
iteratively capturing, with each of at least two image sensors of the distance estimation device, images of the illuminated surfaces simultaneously at discrete time intervals, each captured image including the projected light;
superimposing, with the processor, the images captured by the at least two image sensors at a same time step to produce a superimposed image;
determining, with the processor, a first distance in the superimposed image between the projected light from each of the captured images forming the superimposed image; and
determining, with the processor, a second distance from the at least two image sensors to a surface on which the light is projected;
wherein:
the distance estimation device is disposed on a robotic device for use in avoiding obstacles during navigation;
the distance estimation device is positioned behind a band-pass filter disposed on the robotic device to limit an amount of light;
the surfaces on which the light is projected are within a predetermined range of distance from the laser light emitter;
images captured by each of the at least two image sensors at a same time step at least partially overlap;
the at least two image sensors are symmetrically disposed on either side of the laser light emitter;
each of the at least two image sensors are positioned at an angle such that a field of view of each image sensor at least partially overlaps and each image captured by the at least two image sensors includes the projected light; and
as the second distance decreases, the first distance decreases.

7. The media of claim 6, wherein:
the second distance is determined based on a preconfigured table relating the first distance with the second distance.

8. The media of claim 6, wherein the processor uses computer vision technology to extract the first distance.

9. The media of claim 6, wherein the first distance is determined by measuring in each of the images a distance between the projected light to a common point in each of the images and finding a difference between each of the two distances to the common point.

10. The media of claim 6, wherein the laser light emitter emits a light point or a light line.

\* \* \* \* \*